April 15, 1930.  W. E. BURKS  1,754,737
AEROPLANE
Filed July 21, 1928  2 Sheets-Sheet 1
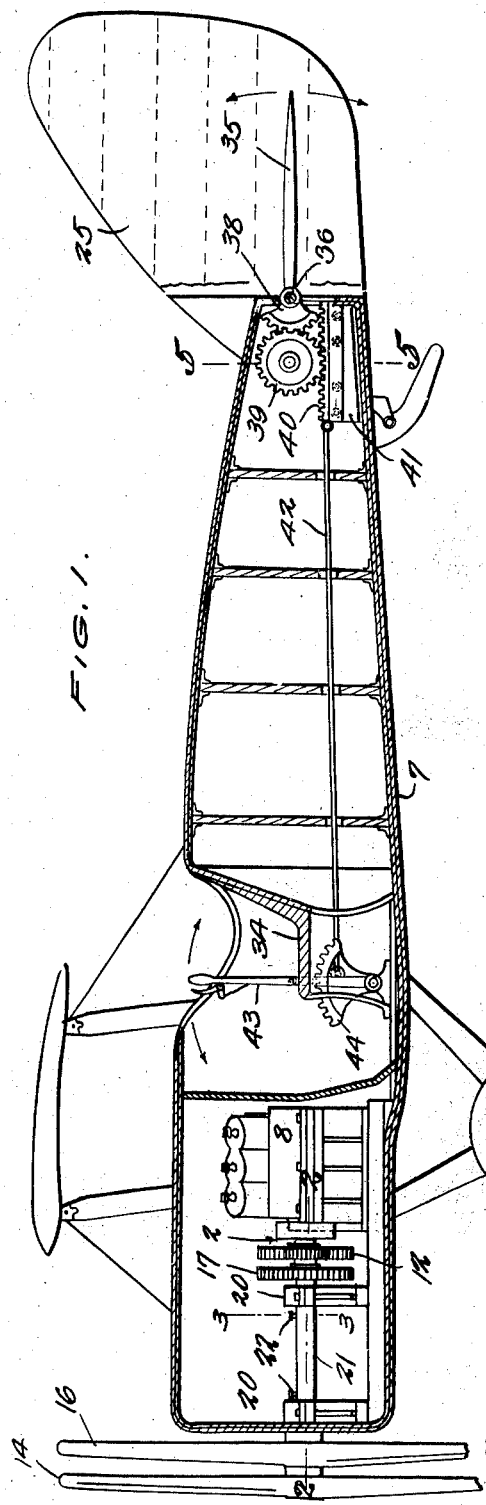
W. E. BURKS
Inventor
Attorneys April 15, 1930. W. E. BURKS 1,754,737
AEROPLANE
Filed July 21, 1928   2 Sheets-Sheet 2
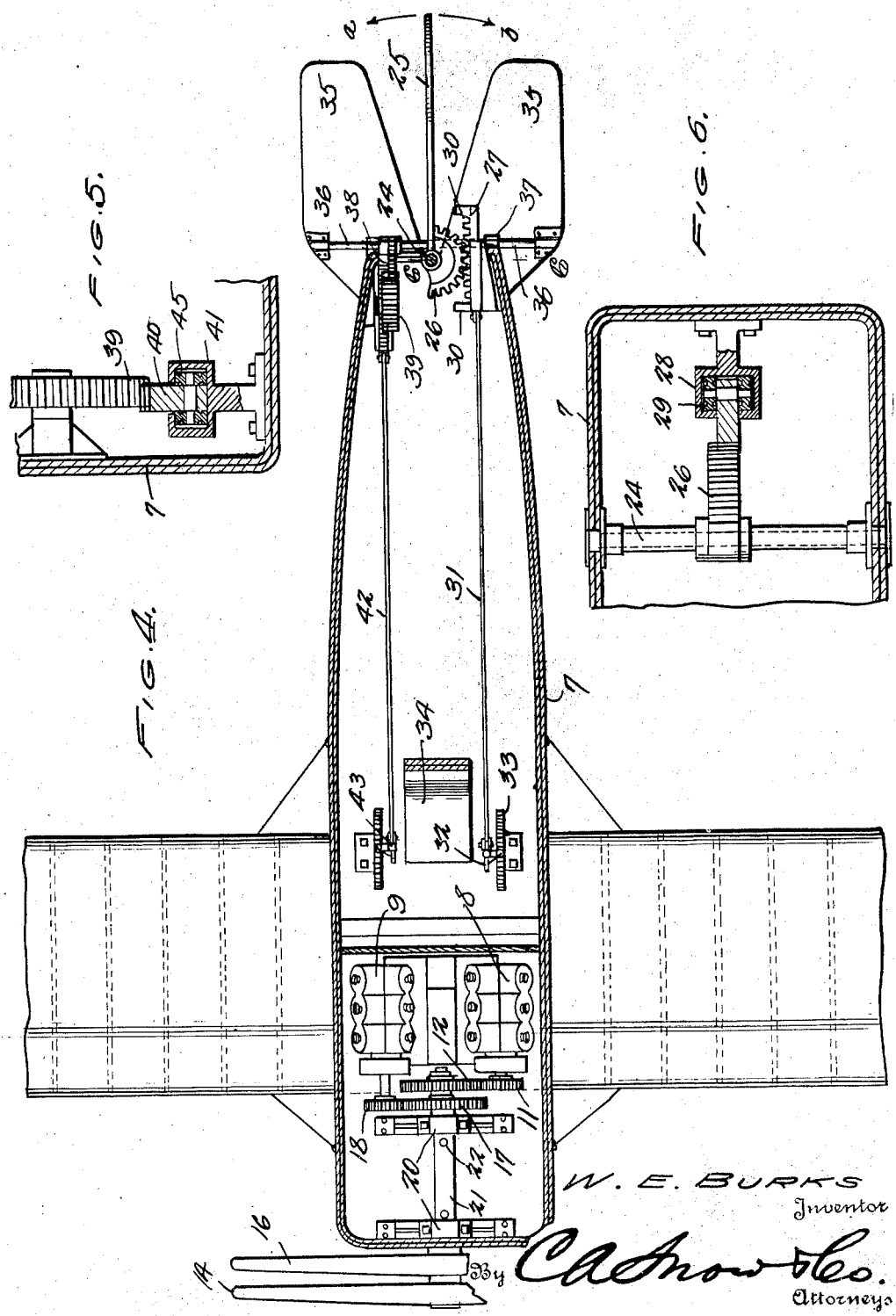

Patented Apr. 15, 1930

1,754,737

UNITED STATES PATENT OFFICE

WILLIAM EDWARD BURKS, OF KERRVILLE, TEXAS

AEROPLANE

Application filed July 21, 1928. Serial No. 294,471

This invention relates to aeroplanes and more especially to means whereby the rudder and the elevating blades can be operated positively by means of certain mechanisms provided therefor, the said mechanisms being of sturdy construction capable of withstanding all strains to which the same might be subjected while in ordinary flight.

Another object is to improve upon the driving mechanism of the aeroplane and to provide improved means for maintaining the propeller shaft properly lubricated.

With the foregoing and other objects in view which will appear as the description proceeds the invention resides in the combination and arrangement of parts and in the details of construction hereinafter described and claimed it being understood that changes in the precise embodiment of the invention here-in disclosed may be made within the scope of what is claimed without departing from the spirit of the invention.

In the accompanying drawings the preferred form of the invention has been shown.

In said drawings,

Figure 1 is a vertical longitudinal section through an aeroplane provided with the present improvements.

Figure 2 is an enlarged section on line 2—2, Figure 1.

Figure 3 is an enlarged section on line 3—3, Figure 1.

Figure 4 is a horizontal section through the fuselage of the aeroplane showing therein the driving and controlling mechanisms.

Figure 5 is an enlarged section on line 5—5, Figure 1.

Figure 6 is an enlarged section on line 6—6, Figure 4.

Referring to the figures by characters of reference 7 designates the fuselage of the aeroplane which, in the present structure, is provided with two motors 8 and 9. The shaft 10 of the motor 8 transmits motion through a gear 11 to a gear 12 secured to a propeller shaft 13, this shaft being extended forwardly and provided, at its forward end, with a propeller 14. Shaft 13 is journaled within a tubular shaft 15 to the forward end of which is connected a second propeller 16 while to the rear end of the tubular shaft 15 is secured a gear 17. This last named gear receives motion through a gear 18 from the shaft 19 of the motor 9. Tubular shaft 15 extends through and is journaled within bearings 20 and it is also extended through a housing sleeve 21 which bears, at its end, in the bearing 20. From the foregoing it will be apparent that the two propellers can be driven independently by the respective engines but about the same axis of rotation.

As shown particularly in Figure 3 a lubricant container 22 can be mounted on and discharge into the housing sleeve 21, and lubricant will thus be supplied to the outer surface of the tubular shaft 15. A desired number of apertures 23 can be formed in the tubular shaft 15 for conducting lubricant to the inner surface of said shaft and to the outer surface of the shaft 13.

Mounted for rotation in the rear portion of the fuselage is a vertical shaft 24 from which radiates the rudder 25 which rotates with the shaft. A segmental gear 26 is also secured to the shaft 24 so as to rotate therewith. The gear 26 meshes with a rack 27 in the form of a slide adapted to reciprocate within a guide 28 which, as shown in Figures 4 and 6, is extended inwardly from one side of the fuselage. Rollers 29 are journaled on the upper and lower faces of the rack and are adapted to travel back and forth within the guide thereby to reduce friction. Excessive travel of the rack in either direction is prevented by gears 30 which extend inwardly from the end portions of the rack and are adapted to come against the gear 26. A rod 31 is attached to the front end of the rack 27 and is extended forwardly to a lever 32 mounted for oscillation adjacent a toothed segment 33 and at a point where it can be conveniently reached by the pilot occupying the seat 34.

The horizontal rudders or elevators 35 are located at opposite sides of the rudder 25 and are connected to a transverse shaft 36 journaled in suitable bearings 37. This shaft is extended above or below the rack 27 and gear 26, as preferred, and has a segmental gear 38 secured thereto. This segmental gear meshes with a gear 39 journaled at one side of the fuselage and said gear 39 in turn meshes with a rack 40 mounted for back and forth sliding movement in a guide 41 secured to the bottom of the fuselage.

A rod 42 is extended forwardly from the rack 40 and is attached to a lever 43 similar to the lever 32. A toothed segment 44 is arranged on this lever and is utilized for holding the lever in any position to which it may be shifted. This lever is located close to the seat 34 so that it can be reached readily by the pilot.

It will be apparent that by pulling backwardly on the lever 32 motion will be transmitted therefrom through rod 31 and rack 27 to the gear 26 and the rudder 25 will be shifted in the direction indicated by the arrow $a$ in Figure 4. By thrusting lever 32 forwardly, however, the rudder 25 will be shifted in the opposite direction as indicated by the arrow $b$ in Figure 4.

Lever 43 is utilized for tilting the elevators 35 so as to cause the aeroplane to move upwardly or downwardly. The gear 39 provides a means for multiplying the movement so that a very quick action of the elevators can be effected.

It will be noted that the mechanism employed for shifting the rudder and the elevators is very compact and will not readily get out of order. Consequently it is especially desirable for use in aeroplane structures.

For the purpose of facilitating the actuation of the rack 40, it is preferred to provide rollers 45 thereon adapted to travel within the guide 41.

What is claimed is:

The combination with a fuselage and a rudder mounted to swing laterally relative thereto, of a transverse shaft extending loosely through the rudder and journaled on the fuselage, elevators carried by the end portions of said shaft and at opposite sides of the rudder, said elevators being spaced to permit lateral swinging of the rudder, a gear secured to and rotatable with the transverse shaft, a guide fixedly mounted in the fuselage, a rack mounted to slide in the guide, an intermediate gear constantly in mesh with the gear on the shaft and with the rack for transmitting motion from the rack to the shaft, an actuating lever, and means extending straight from the lever to the rack for transmitting motion to the rack and the parts actuated thereby.

In testimony that I claim the foregoing as my own, I have hereto affixed my signature.

WILLIAM EDWARD BURKS.